(12) United States Patent
So et al.

(10) Patent No.: US 10,539,803 B2
(45) Date of Patent: Jan. 21, 2020

(54) OPTICAL SYSTEM FOR LASER APPARATUS

(71) Applicant: SAMSUNG DISPLAY CO., LTD., Yongin-si, Gyeonggi-Do (KR)

(72) Inventors: Byung Soo So, Yongin-si (KR); Jong Oh Seo, Seoul (KR); Dong-Min Lee, Yongin-si (KR); Sang Ho Jeon, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 670 days.

(21) Appl. No.: 15/148,480

(22) Filed: May 6, 2016

(65) Prior Publication Data
US 2017/0075124 A1   Mar. 16, 2017

(30) Foreign Application Priority Data
Sep. 15, 2015   (KR) .................. 10-2015-0130470

(51) Int. Cl.
*G02B 27/09*   (2006.01)
*H01S 3/00*   (2006.01)
*G02B 17/00*   (2006.01)

(52) U.S. Cl.
CPC ....... *G02B 27/0927* (2013.01); *G02B 17/008* (2013.01); *G02B 27/0977* (2013.01); *H01S 3/0071* (2013.01); *H01S 3/0085* (2013.01)

(58) Field of Classification Search
CPC ................................................ G02B 17/008
USPC ................................. 359/618, 629, 639, 640
See application file for complete search history.

(56) References Cited

U.S. PATENT DOCUMENTS 5,153,773 A * 10/1992 Muraki ................ G02B 3/0056
                                                                   359/211.1

FOREIGN PATENT DOCUMENTS

| CN | 103744071 | 4/2014 | |
| JP | 2006-078655 | 3/2006 | |
| JP | 4665290 | 1/2011 | |
| KR | 1020090015962 | 2/2009 | |
| WO | WO-0188474 A1 * | 11/2001 | ............. G01B 11/14 |

* cited by examiner

Primary Examiner — William R Alexander
Assistant Examiner — Gary W O'Neill
(74) Attorney, Agent, or Firm — F. Chau & Associates, LLC

(57) ABSTRACT

An optical system for a laser apparatus includes: a long-short axis reversing module that includes a splitter, a first mirror, and a second mirror positioned in a propagation path of an incident laser beam, where the first mirror includes a first submirror and a second submirror connected to each other at a predetermined angle therebetween. The optical system converts an incident laser beam having an asymmetric energy distribution into an emitted laser beam with a symmetric energy distribution.

19 Claims, 12 Drawing Sheets

OPTICAL SYSTEM FOR LASER APPARATUS

CROSS-REFERENCE TO RELATED APPLICATION

This application claims priority from, and the benefit of, Korean Patent Application No. 10-2015-0130470 filed in the Korean Intellectual Property Office on Sep. 15, 2015, the contents of which are herein incorporated by reference in their entirety.

BACKGROUND

1. Technical Field Embodiments of present disclosure are directed to a laser apparatus.

2. Discussion of the Related Art

In general, methods of crystallizing an amorphous silicon layer into a polycrystalline silicon layer include solid phase crystallization (SPC), metal induced crystallization (MIC), metal induced lateral crystallization (MILC), excimer laser annealing (ELA), etc. In particular, to manufacture an organic light emitting diode (OLED) display or a liquid crystal display (LCD), the excimer laser annealing (ELA) method uses a laser beam to crystallize an amorphous silicon layer into a polycrystalline silicon layer.

A laser apparatus used in an excimer laser annealing (ELA) process includes a laser generator that generates a source laser beam. The source laser beam is a first laser beam has a rectangle shaped cross-section thereof with a long axis and a short axis. The source laser beam typically has an Gaussian energy distribution in both the long axis direction and the short axis direction. The Gaussian distribution is a normal distribution that has left and right symmetry with respect to an average.

However, shaking may be generated between a plurality of laser shots, which can alter the energy distribution of the source laser beam to deviate from the normal distribution, thereby causing a left/right asymmetry. In this case, crystallization defects may be generated in the polycrystalline silicon layer.

SUMMARY

Exemplary embodiments of the present disclosure can provide a laser apparatus that can minimize crystallization defects, reducing sizes thereof and manufacturing cost.

An optical system according to an exemplary embodiment of the present disclosure for a laser apparatus includes: a long-short axis reversing module that includes a splitter, a first mirror, and a second mirror positioned in a propagation path of an incident laser beam, and the first mirror includes a first submirror and a second submirror connected to each other at a predetermined angle therebetween. The optical system converts an incident laser beam having an asymmetric energy distribution into an emitted laser beam with a symmetric energy distribution.

The splitter, the first mirror, and the second mirror may be sequentially positioned in the propagation path of the incident laser beam.

The long-short axis reversing module may mix a first emitted beam reflected from the splitter and a second emitted beam that passes through the splitter and is reflected from the first mirror and the second mirror to again pass through the splitter into the emitted laser beam.

The long-short axis reversing module may invert the second emitted in both a long axis direction and a short axis direction with respect to the first emitted beam.

The first mirror may reflect a transmitted beam received from the splitter into a first reflected beam that is inverted in the long axis direction with respect to the first emitted beam.

The second mirror may reflect the first reflected beam into a second reflected beam that is inverted in the short axis direction with respect to the first reflected beam.

The splitter, the second mirror, and the first mirror may be sequentially positioned in the propagation path of the incident laser beam.

The long-short axis reversing module may further include a third mirror positioned in the propagation path of the incident laser beam.

The splitter, the second mirror, the first mirror, and the third mirror may be positioned in the propagation of the incident laser beam.

The long axis direction of the incident laser beam incident to the first mirror may be perpendicular to a boundary between the first submirror and the second submirror.

An optical system according to an exemplary embodiment of the present disclosure for a laser apparatus includes: a long-short axis reversing module that includes a splitter, a first mirror, and a second mirror positioned in a propagation path of an incident laser beam. The long-short axis reversing module mixes a first emitted beam reflected from the splitter and a second emitted beam that passes through the splitter and is reflected from the first mirror and the second mirror to again pass through the splitter into an emitted laser beam, and the second emitted beam is inverted in both a long axis direction and a short axis direction with respect to the first emitted beam.

The incident laser beam may have an asymmetric energy distribution, and the optical system converts the incident laser beam into an emitted laser beam with a symmetric energy distribution.

The splitter, the first mirror, and the second mirror may be sequentially positioned in the propagation path of the incident laser beam.

The first mirror may reflect a transmitted beam received from the splitter into a first reflected beam that is inverted in the long axis direction with respect to the first emitted beam, and the second mirror may reflect the first reflected beam into a second reflected beam that is inverted in the short axis direction with respect to the first reflected beam.

The splitter, the second mirror, and the first mirror may be sequentially positioned in the propagation path of the incident laser beam.

The second mirror may reflect a transmitted beam received from the splitter into a first reflected beam that is inverted in the short axis direction with respect to the transmitted beam, and the first mirror may reflect the first reflected beam into a second reflected beam that is inverted in the long axis direction with respect to the first reflected beam.

The long-short axis reversing module may further include a third mirror positioned in the propagation path of the incident laser beam.

The second mirror, the first mirror, and the third mirror may be sequentially positioned in the propagation path of the incident laser beam.

The first mirror may include a first submirror and a second submirror connected to each other at a predetermined angle therebetween. A long axis direction of the incident laser beam incident to the first mirror may be perpendicular to a boundary between the first submirror and the second submirror.

According to an exemplary embodiment of the present disclosure, an incident laser beam having an asymmetric energy distribution may be converted into an emitted laser beam with a symmetric energy distribution using a first long-short axis reversing module that includes a splitter, a first mirror, and a second mirror.

As described above, a first long-short axis reversing module may be manufactured using a small number of mirrors such that a manufacturing cost may be reduced.

In addition, a first long-short axis reversing module may be manufactured using a small number of the mirrors such that a size of an optical system may be minimized.

DETAILED DESCRIPTION OF EXEMPLARY EMBODIMENTS

Figure 1:
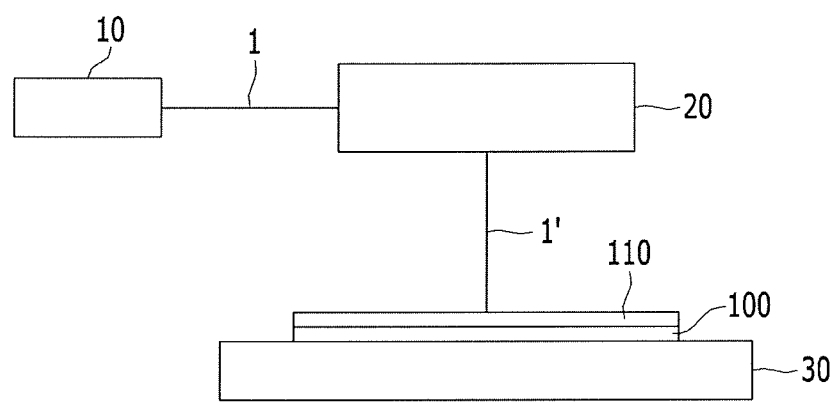
FIG. 1 is a schematic diagram of a laser apparatus according to an exemplary embodiment of the present disclosure.

Exemplary embodiment of the present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Parts that are irrelevant to the description may be omitted to clearly describe exemplary embodiments of the present disclosure, and like reference numerals may designate like elements throughout the specification.

Now, a laser apparatus according to an exemplary embodiment of the present disclosure will be described in detail with reference to accompanying drawings.

FIG. 1 is a schematic diagram of a laser apparatus according to an exemplary embodiment of the present disclosure.

As shown in FIG. 1, a laser apparatus according to an exemplary embodiment of the present disclosure includes a laser generator 10 that generates an incident laser beam 1, and an optical system 20 that processes the incident laser beam 1 to generate an emitted laser beam 1'. A substrate 100 having a thin film 110 disposed thereon is mounted on a stage 30 and the thin film 110 is crystallized by the emitted laser beam 1'.

The incident laser beam 1 is generated by the laser generator 10 as an excimer laser beam and passes through the optical system 20 to be converted into the emitted laser beam 1', which induces a phase transition in the thin film 110, thereby crystallizing the thin film 110. The thin film 110 may be an amorphous silicon layer formed by methods such as low pressure chemical vapor deposition (LPCVD), atmospheric pressure chemical vapor deposition (APCVD), plasma enhanced chemical vapor deposition (PECVD), sputtering, and vacuum evaporation.

Figure 2:
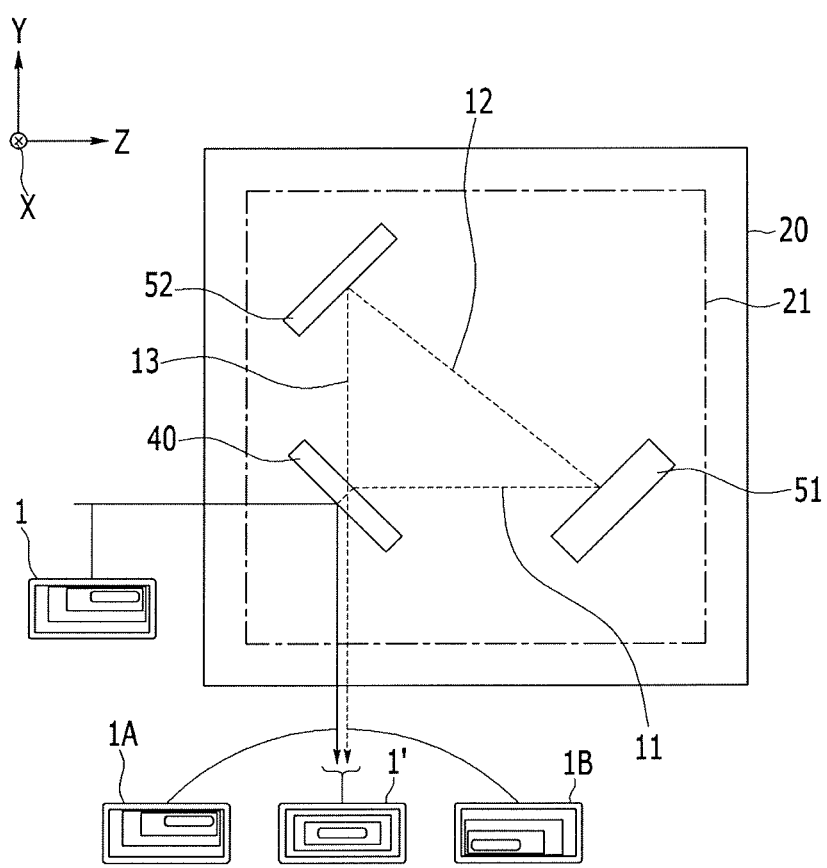
FIG. 2 is a schematic view of the optical system of FIG. 1.
Figure 3:
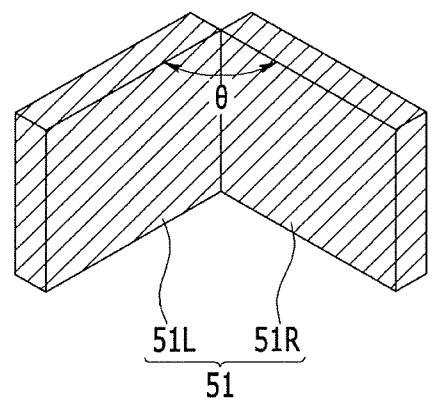
FIG. 3 is a perspective view of a first mirror of a laser apparatus according to an exemplary embodiment of the present disclosure.
Figure 4:
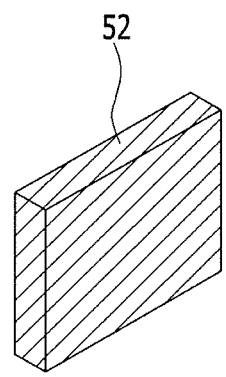
FIG. 4 is a perspective view of a second mirror of a laser apparatus according to an exemplary embodiment of the present disclosure.

FIG. 2 is a schematic view of the optical system of FIG. 1, FIG. 3 is a perspective view of a first mirror of a laser apparatus according to an exemplary embodiment of the present disclosure, and FIG. 4 is a perspective view of a second mirror of a laser apparatus according to an exemplary embodiment of the present disclosure.

As shown in FIG. 2, the optical system 20 includes a first long-short axis reversing module 21 that reverses an incident laser beam 1 having an asymmetric energy distribution in both a long axis direction (X and a short axis direction (Y) to convert it into an emitted laser beam 1' having a symmetric energy distribution.

The first long-short axis reversing module 21 includes a splitter 40 that reflects part of the incident light and transmitting the remaining part of the incident light, and a first and a second total reflection mirrors 51, 52 that reflect all incident light. The splitter 40, the first mirror 51, and the second mirror 52 are sequentially positioned on the propagation path of the incident laser beam 1.

As shown in FIG. 3, the first mirror 51 includes a first submirror 51L and a second submirror 51R connected to each other. The first submirror 51L and the second submirror 51R are connected at a predetermined angle (θ) therebetween. As shown in FIG. 4, the second mirror 52 has a plate shape.

As shown in FIG. 2, the incident laser beam 1 is split into a first emitted beam 1A and a second emitted beam 1B, and the first and second emitted beams 1A and 1B are subsequently mixed by the splitter 40, the first mirror 51, and the second mirror 52 to generate the emitted laser beam 1'.

The splitter 40 reflects 50% of the incident laser beam 1 to generate the first emitted beam 1A, and transmits the remaining 50% of the incident laser beam 1 to generate a transmitted beam 11. The first mirror 51 reflects the transmitted beam 11 into the first reflected beam 12. The second mirror 52 reflects the first reflected beam 12 into the second reflected beam 13. The second reflected beam 13 passes through the splitter 40 which converts it into the second emitted beam 1B.

In FIG. 2, for convenience of illustration, FIG. 2 shows an asymmetric incident laser beam 1 as having a relatively high energy density in the upper right portion, however this is exemplary, and embodiments are not limited thereto. Similarly, the first emitted beam 1A, like the incident laser beam 1, is illustrates as having a high energy density in the upper right, while the second emitted beam 1B is shown as having a relatively high energy density in the lower left portion. Accordingly, the emitted laser beam 1' generated by mixing the first emitted beam 1A and the second emitted beam 1B has a high energy density in the center part, which has a symmetric, normal energy distribution. Accordingly, crystallization defects due to shaking between shots of the laser apparatus may be minimized, and simultaneously the generation timing of the crystallization defects may be delayed. Accordingly, a maintenance cycle of the laser apparatus may also be extended, which can reduce the operating costs of the laser apparatus.

The first long-short axis reversing module 21 can be manufactured with the splitter 40, the first mirror 51, and the second mirror 52, which reduces the manufacturing cost. Also, the first long-short axis reversing module 21 can be manufactured using fewer mirrors, which can reduce the size of the optical system.

Next, a detailed operation of the first long-short axis reversing module 21 will be described with reference to FIG. 5, FIG. 6, and FIG. 7.

Figure 5:
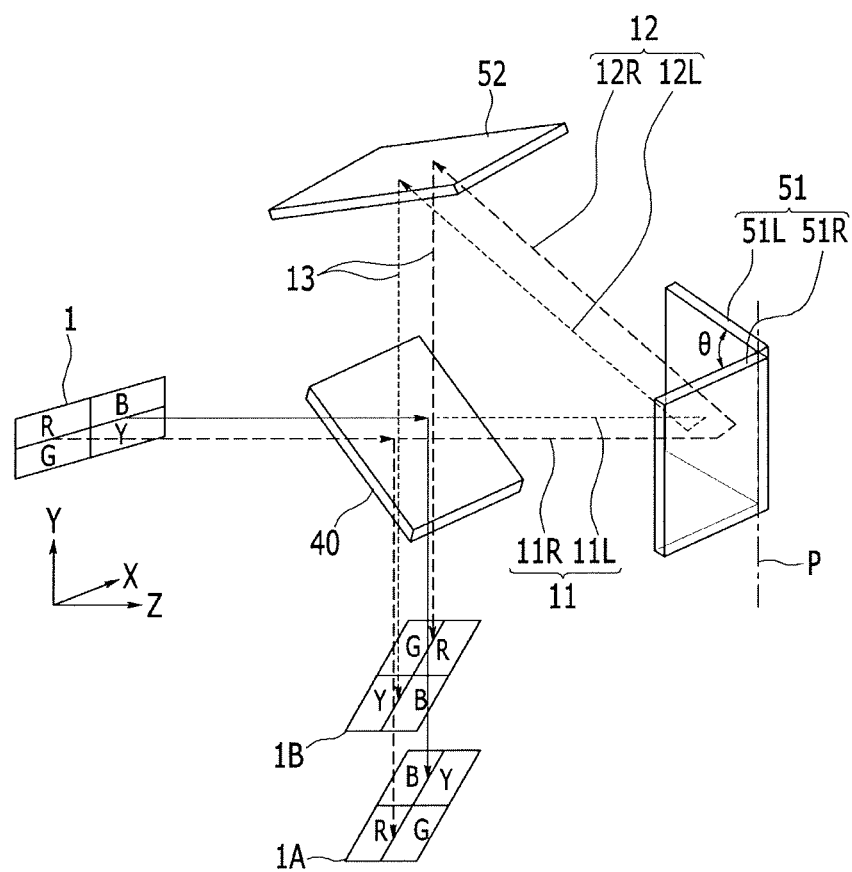
FIG. 5 is a detailed view of the optical system of FIG. 1.
Figure 6:
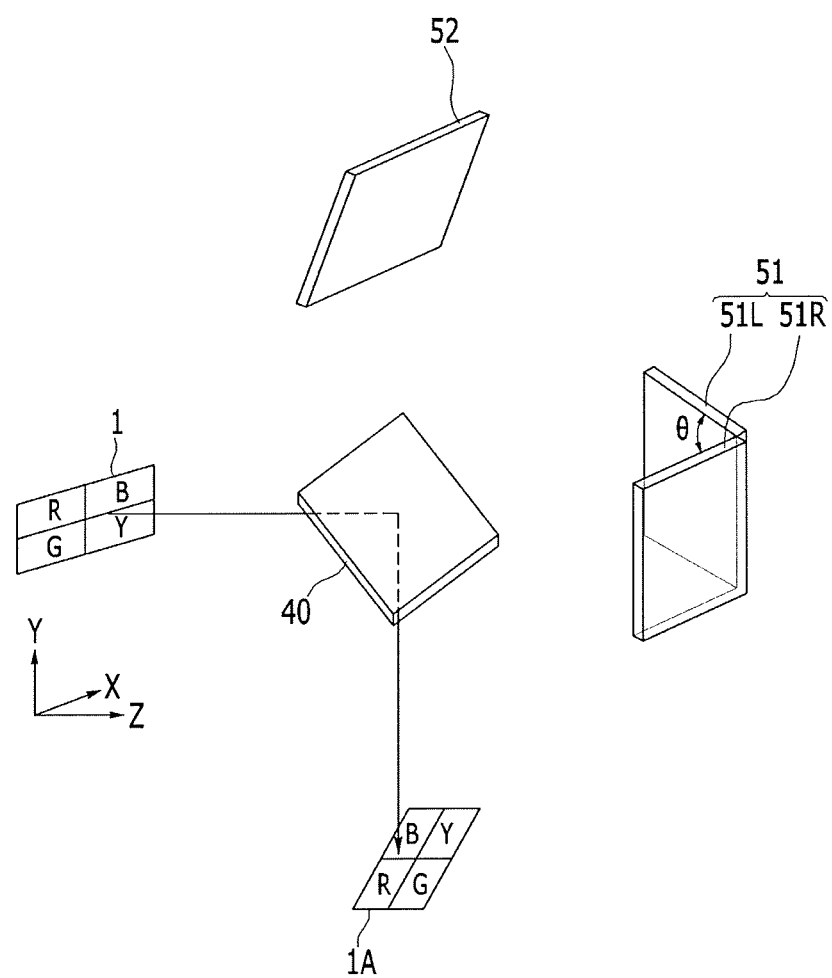
FIG. 6 illustrates a first emitted beam reflected from the splitter in FIG. 5.
Figure 7:
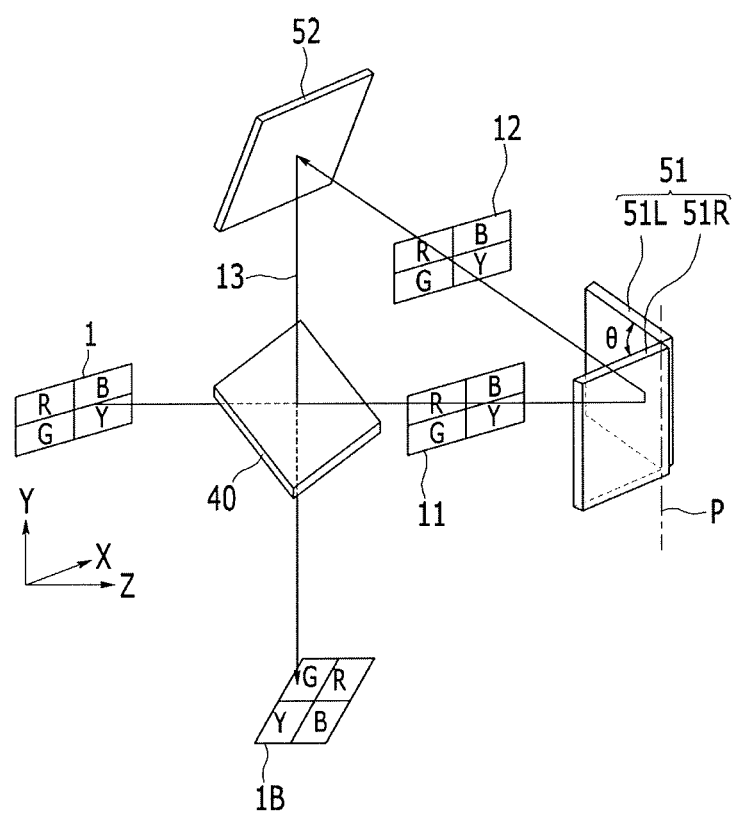
FIG. 7 illustrates a first reflected beam passing the splitter and reflected from the first mirror and a second emitted beam reflected from the second mirror and passing the splitter in FIG. 5.

FIG. 5 is a detailed view of the optical system of FIG. 1, FIG. 6 illustrates a first emitted beam reflected from the splitter in FIG. 5, and FIG. 7 illustrates a first reflected beam passing the splitter and reflected from the first mirror and a second emitted beam reflected from the second mirror and passing the splitter in FIG. 5.

As shown in FIG. 5 and FIG. 6, the incident laser beam 1 has a rectangular shape with a long axis direction (X) and a short axis direction (Y), and is incident to the splitter 40 in the propagation direction (Z). For convenience, it is assumed that the upper left portion of the incident laser beam 1 is red R, the upper right portion is blue B, the lower left portion is green G, and the lower right portion is yellow Y.

The incident laser beam 1 is 50% reflected from the splitter 40 to become the first emitted beam 1A. In this case, no long axis or short axis inversions are generated between the incident laser beam 1 and the first emitted beam 1A. Accordingly, like the incident laser beam 1, the upper left portion of the first emitted beam 1A is red R, the upper right portion is blue B, the lower left is green G, and the lower right portion is yellow Y.

Next, as shown in FIG. 5 and FIG. 7, 50% of the incident laser beam 1 passes through the splitter 40 to become the transmitted beam 11. Since the transmitted beam 11 is the same as the incident laser beam 1, the upper left portion of the transmitted beam 11 is red R, the upper right portion is blue B, the lower left portion is green G, and the lower right portion is yellow Y.

The incident laser beam 1, with the long axis direction (X) perpendicular to the boundary P between the first submirror 51L and the second submirror 51R, passes through the splitter 40, thereby becoming the transmitted beam 11. Accordingly, the transmitted beam 11, with the long axis direction (X) perpendicular to the boundary P, is also incident to the first mirror 51.

The first mirror 51 reflects the transmitted beam 11 into the first reflected beam 12. In this case, the first mirror 51 inverts the transmitted beam 11 in the long axis direction (X) to generate the first reflected beam 12. That is, the first reflected beam 12 reflected from the first mirror 51 is inverted in the long axis direction (X) with respect to the transmitted beam 11. Accordingly, the upper left portion of the first reflected beam 12 is blue B, the upper right portion is red R, the lower left portion is yellow Y, and the lower right portion is green G.

The second mirror 52 reflects the first reflected beam 12 into the second reflected beam 13. In this case, the second mirror 52 inverts the first reflected beam 12 in the short axis direction (Y) to generate the second reflected beam 13. That is, the second reflected beam 13 reflected from the second mirror 52 is inverted in the short axis direction (Y) with respect to with the first reflected beam 12. The second reflected beam 13 passes through the splitter 40 as is, thereby becoming the second emitted beam 1B. Accordingly, the upper left portion of the second emitted beam 1B is yellow Y, upper right portion is green G, the lower left is blue B, and the lower right portion is red R.

As described above, the second emitted beam 1B is inverted in both the long axis direction (X) and the short axis direction (Y) compared with the first emitted beam 1A. Accordingly, as shown in FIG. 2, if the incident laser beam 1 has a high energy density in the upper right portion, the first emitted beam 1A has a high energy density in the upper right portion like the incident laser beam 1, and the second emitted beam 1B has a high energy density in the lower left portion. Accordingly, the emitted laser beam 1' formed by mixing the first emitted beam 1A and the second emitted beam 1B has a high energy density in the center, thereby having a symmetric, normal energy distribution.

Next, long axis inversion will be described with reference to FIG. 5 and FIG. 8.

Figure 8:
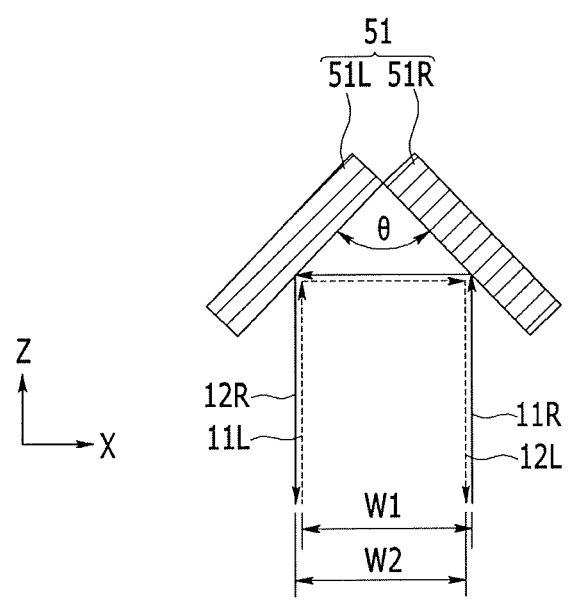
FIG. 8 illustrates the relation of a transmitted beam and a first reflected beam when an angle in the first mirror of FIG. 3 is 90 degrees.

FIG. 8 illustrates the relation of a transmitted beam and a first reflected beam when an angle of the first mirror of FIG. 3 is 90 degrees. FIG. 8 illustrates the case in which the angle between the first submirror 51L and the second submirror 51R of the first mirror is 90 degrees. In this case, the transmitted beam 11 incident to the first mirror 51 in the propagation direction (Z) has a first width W1 in the long axis direction (X), and for convenience, the transmitted beam 11 is divided into a left portion 11L and a right portion 11R, and the first reflected beam 12 is divided into a left portion 12L and a right portion 12R.

As shown in FIG. 5 and FIG. 8, the left portion 11L of the transmitted beam 11 is reflected from the first submirror 51L to be incident to the second submirror 51R, and is again reflected from the second submirror 51R to become the left portion 12L of the first reflected beam 12. Also, the right portion 11R of the transmitted beam 11 is reflected from the second submirror 51R to be incident to the first submirror 51L, and is again reflected from the first submirror 51L to becomes the right portion 12R of the first reflected beam 12.

As described above, since the left portion 11L of the transmitted beam 11 becomes the left portion 12L of the first reflected beam 12, the right portion 11R of the transmitted beam 11 becomes the right portion 12R of the first reflected beam 12, and the propagation direction Z of the transmitted beam 11 is opposite to that of the first reflected beam 12, the first reflected beam 12 is inverted in the long axis direction (X) with respect to with the transmitted beam 11.

The transmitted beam 11, which has a first width W1, is reflected by the first mirror 51 into the first reflected beam 12, which has a second width W2. In this case, when the angle θ between the first submirror 51L and the second submirror 51R is 90 degrees, the first width W1 and the second width W2 are the same.

By controlling the angle θ of the first mirror 51, the second width W2 of the first reflected beam 12 may be controlled.

Figure 9:
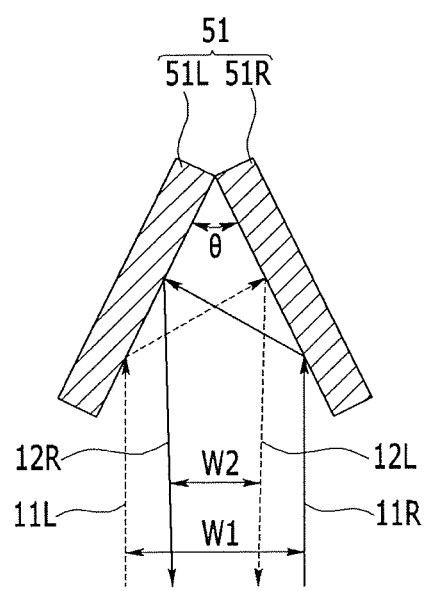
FIG. 9 illustrates the relation of a transmitted beam and a first reflected beam when an angle in the first mirror of FIG. 3 is less than 90 degrees.
Figure 10:
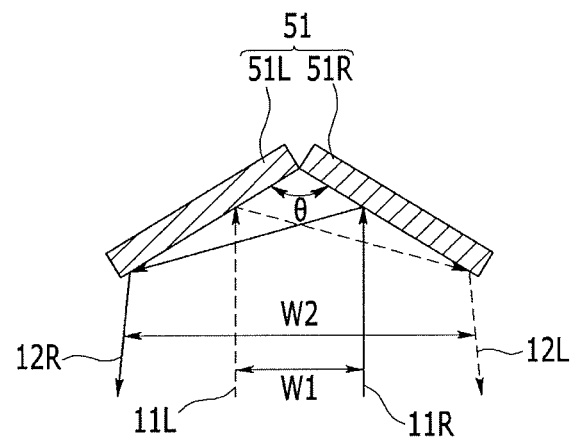
FIG. 10 illustrates the relation of a transmitted beam and a first reflected beam when an angle in the first mirror of FIG. 3 is greater than 90 degrees.

FIG. 9 illustrates the relation of a transmitted beam and a first reflected beam when an angle in the first mirror of FIG. 3 is less than 90 degrees, and FIG. 10 illustrates the relation of a transmitted beam and a first reflected beam when an angle in the first mirror of FIG. 3 is greater than 90 degrees.

As shown in FIG. 9, when the between angle θ of the first mirror 51 is less than 90 degrees, the second width W2 of the first reflected beam 12 is less than the first width W1 of the transmitted beam 11. As shown in FIG. 10, when the angle θ in the first mirror 51 is greater than 90 degrees, the second width W2 of the first reflected beam 12 is greater than the first width W1 of the transmitted beam 11. As described above, by controlling the angle θ in the first mirror 51, the second width W2 of the first reflected beam 12 may be controlled. The angle θ may be from about 1 degree to about 179 degrees. When the angle θ is less than 1 degree, the transmitted beam 11 may not be incident to the first mirror 51, and thus it may be challenging to generate long axis inversion. When the angle θ is larger than 179 degrees, the first mirror 51 is almost flat, and thus it may be challenging to generate long axis inversion.

In an exemplary embodiment, the splitter, the first mirror, and the second mirror are sequentially positioned in the propagation path of the incident laser beam, however in another exemplary embodiment, the splitter, the second mirror, and the first mirror may be sequentially positioned in the propagation path of the incident laser beam.

Next, a laser apparatus according to another exemplary embodiment of the present disclosure will be described with reference to FIG. 11.

This exemplary embodiment is substantially the same as an exemplary embodiment shown in FIG. 1, FIG. 2, and FIG. 5 except for the position of the first mirror and the second mirror, such that a repeated description is omitted.

Figure 11:
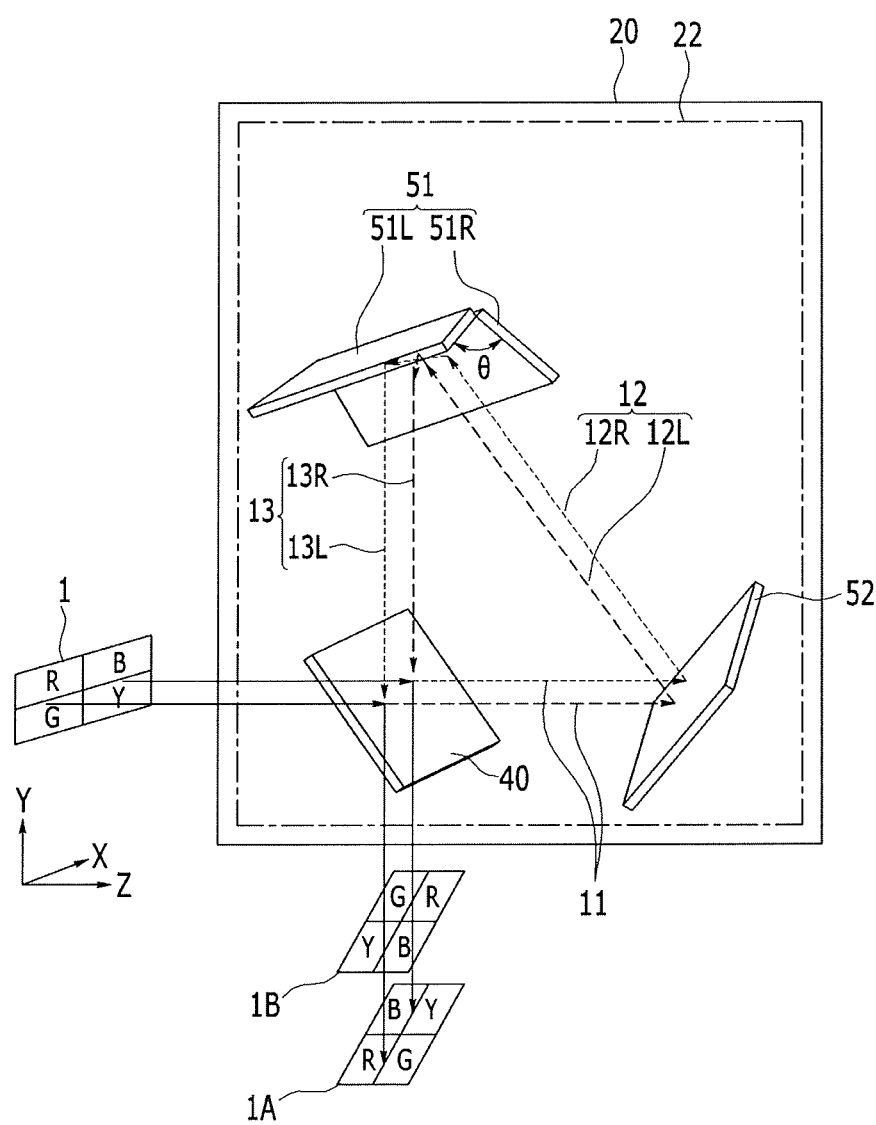
FIG. 11 is a detailed view that illustrates an optical system of a laser apparatus according to another exemplary embodiment of the present disclosure.

FIG. 11 is a detailed view that illustrates an optical system of a laser apparatus according to another exemplary embodiment of the present disclosure.

As shown in FIG. 11, the optical system 20 includes a second long-short axis reversing module 22 in which the splitter 40, the second mirror 52, and the first mirror 51 are sequentially positioned in the propagation path of the incident laser beam 1. The first mirror 51 includes a first submirror 51L and a second submirror 51R connected to each other. The first submirror 51L and the second submirror 51R are connected at an angle θ therebetween.

The splitter 40 reflects 50% of the incident laser beam 1 into the first emitted beam 1A, and transmits the remaining 50% of incident laser beam 1 as the transmitted beam 11. In this case, no long axis inversion or short axis inversion is generated between the incident laser beam 1 and the first emitted beam 1A. Accordingly, like the incident laser beam 1, the upper left portion of the first emitted beam 1A is red R, the upper right portion is blue B, the lower left portion is green G, and the lower right portion is yellow Y.

The second mirror 52 reflects the transmitted beam 11 into first reflected beam 12. In this case, the second mirror 52 inverts the transmitted beam 11 in the short axis direction (Y) to generate the first reflected beam 12. That is, the first reflected beam 12 reflected from the second mirror 52 is inverted in the short axis direction (Y) with respect to the transmitted beam 11.

Also, the first mirror 51 reflects the first reflected beam 12 into the second reflected beam 13. In this case, the first mirror 51 inverts the first reflected beam 12 in the long axis direction (X) to generate the second reflected beam 13. That is, the second reflected beam 13 reflected from the first mirror 51 is inverted in the long axis direction (X) with respect to the first reflected beam 12.

The left portion 12L of the first reflected beam 12 is reflected from the first submirror 51L to be incident to the second submirror 51R, and is again reflected from the second submirror 51R into the left portion 13L of the second reflected beam 13. The right portion 12R of the first reflected beam 12 is reflected from the second submirror 51R to be incident to the first submirror 51L, and is again reflected from the first submirror 51L into the right portion 13R of the second reflected beam 13.

As described above, since the left portion 12L of the first reflected beam 12 becomes the portion light 13L of the second reflected beam 13, the right portion 12R of the first reflected beam 12 becomes the right portion 13R of the second reflected beam 13, and the propagation direction of the first reflected beam 12 is opposite to that of the second reflected beam 13, such that the second reflected beam 13 is inverted in the long axis direction (X) with respect to the first reflected beam 12.

The second reflected beam 13 passes through the splitter 40 to become the second emitted beam 1B.

Accordingly, the upper left portion of the second emitted beam 1B is yellow Y, the upper right portion is green, the lower left portion is blue B, and the lower right portion is red R.

As described above, the second emitted beam 1B is inverted in both the long axis direction (X) and in the short axis direction (Y) with respect to the first emitted beam 1A. Accordingly, when the incident laser beam 1 has an asymmetrical energy distribution, the emitted laser beam formed by mixing the first emitted beam 1A and the second emitted beam 1B has a symmetric, normal energy distribution.

In another exemplary embodiment, the splitter, the second mirror, and the first mirror are sequentially positioned in the propagation path of the incident laser beam, however, in yet another exemplary embodiment, the splitter, the second mirror, the first mirror, and a third mirror may be sequentially positioned in the propagation path of the incident laser beam.

Next, a laser apparatus according to another exemplary embodiment of the present disclosure will be described in detail with reference to FIG. 12.

Figure 12:
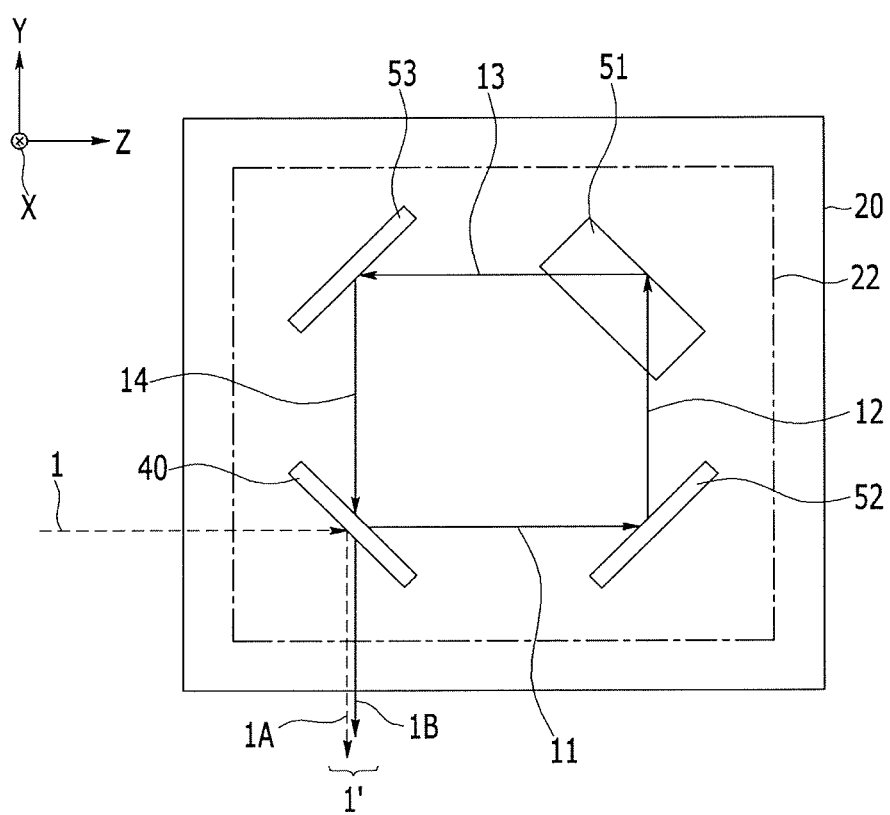
FIG. 12 is a detailed view that illustrates an optical system of a laser apparatus according to another exemplary embodiment of the present disclosure.

An exemplary embodiment of FIG. 12 is substantially the same as an exemplary embodiment of FIG. 11, except for the addition of the third mirror such that a repeated description is omitted.

FIG. 12 is a detailed view that illustrates an optical system of a laser apparatus according to another exemplary embodiment of the present disclosure.

As shown in FIG. 12, the optical system 20 includes a long axis reversing module 23 in which the splitter 40, the second mirror 52, the first mirror 51, and a third mirror 53 are sequentially positioned in the propagation path of the incident laser beam 1. The first mirror 51 includes the first submirror 51L and the second submirror 51R connected to each other. The first submirror 51L and the second submirror 51R are connected to each other at an angle θ therebetween (referring to FIG. 3). The first mirror 51 and the third mirror 53 totally reflect all incident light.

The splitter 40 reflects 50% of the incident laser beam 1 to generate the first emitted beam 1A and transmits the remaining 50% of the incident laser beam 1 as the transmitted beam 11. In this case, no long axis inversion or short axis inversion is generated between the incident laser beam 1 and the first emitted beam 1A.

The second mirror 52 reflects the transmitted beam 11 into the first reflected beam 12. In this case, the second mirror 52 inverts the transmitted beam 11 in the short axis direction (Y) to generate the first reflected beam 12. That is, the first reflected beam 12 reflected from the second mirror 52 is inverted in the short axis direction (Y) with respect to the transmitted beam 11. The first mirror 51 reflects the first reflected beam 12 into the second reflected beam 13. In this case, the first mirror 51 inverts the first reflected beam 12 in the long axis direction (X) to generate the second reflected beam 13. That is, the second reflected beam 13 reflected from the first mirror 51 is inverted in the long axis direction (X) with respect to the first reflected beam 12.

The third mirror 53 reflects the second reflected beam 13 into the third reflected beam 14. In this case, the third mirror 53 inverts the second reflected beam 13 in the short axis direction (Y) to generate the third reflected beam 14. That is, the third reflected beam 14 reflected from the third mirror 53 is inverted in the short axis direction (Y) with respect to the second reflected beam 13. Accordingly, the third reflected beam 14 is not short axis inverted with respect to the transmitted beam 11.

The third reflected beam 14 passes through the splitter 40 to become the second emitted beam 1B.

As described above, the second emitted beam 1B is inverted in the long axis direction (X) with respect to the first emitted beam 1A. Accordingly, when the incident laser beam 1 has an asymmetrical energy distribution, the emitted laser beam 1' formed by mixing the first emitted beam 1A and the second emitted beam 1B have a symmetric, normal energy distribution.

As described above, since a long axis reversing module includes only the splitter 40, the first mirror 51, the second mirror 52, and the third mirror 53, the manufacturing cost may be reduced. In addition, by using a small number of mirrors, a size of an optical system that includes a long axis reversing module may be minimized.

While this disclosure has been described in connection with what is presently considered to be practical exemplary embodiments, it is to be understood that the disclosure is not limited to the disclosed exemplary embodiments, but, on the contrary, is intended to cover various modifications and equivalent arrangements included within the spirit and scope of the appended claims.

What is claimed is:

1. An optical system for a laser apparatus comprising:
a long-short axis reversing module that includes
a splitter, a first mirror, and a second mirror positioned in a propagation path of an incident laser beam, and
wherein the first mirror includes a first submirror and a second submirror,
wherein an edge of the first submirror and an edge of the second submirror are directly attached to each other and a surface of the first submirror and a surface of the second submirror have a predetermined angle therebetween, and
wherein the optical system converts the incident laser beam having an asymmetric energy distribution into an emitted laser beam with a symmetric energy distribution.

2. The optical system of claim 1, wherein
the splitter, the first mirror, and the second mirror are sequentially positioned in the propagation path of the incident laser beam.

3. The optical system of claim 2, wherein
the long-short axis reversing module mixes a first emitted beam reflected from the splitter and a second emitted beam that passes through the splitter and is reflected from the first mirror and the second mirror to again pass through the splitter into the emitted laser beam.

4. The optical system of claim 3, wherein
the long-short axis reversing module inverts the second emitted beam in both a long axis direction and a short axis direction with respect to the first emitted beam.

5. The optical system of claim 4, wherein
the first mirror reflects a transmitted beam received from the splitter into a first reflected beam that is inverted in the long axis direction with respect to the first emitted beam.

6. The optical system of claim 5, wherein
the second mirror reflects the first reflected beam into a second reflected beam that is inverted in the short axis direction with respect to the first reflected beam.

7. The optical system of claim 1, wherein
the splitter, the second mirror, and the first mirror are sequentially positioned in the propagation path of the incident laser beam.

8. The optical system of claim 1, wherein
the long-short axis reversing module further includes a third mirror positioned in the propagation path of the incident laser beam.

9. The optical system of claim 8, wherein
the second mirror, the first mirror, and the third mirror are sequentially positioned in the propagation path of the incident laser beam.

10. The optical system of claim 1, wherein
a long axis direction of the incident laser beam incident to the first mirror is perpendicular to a boundary between the first submirror and the second submirror.

11. An optical system for a laser apparatus comprising:
a long-short axis reversing module that includes
a splitter, a first mirror, and a second mirror positioned in a propagation path of an incident laser beam, and
wherein the first mirror includes a first submirror and a second submirror,
wherein an edge of the first submirror and an edge of the second submirror are directly connected and a surface of the first submirror and a surface of the second submirror have a predetermined angle therebetween,
wherein the long-short axis reversing module mixes a first emitted beam reflected from the splitter and a second emitted beam that passes through the splitter and is reflected from the first mirror and the second mirror to again pass through the splitter into an emitted laser beam, and
wherein the second emitted beam is inverted in both a long axis direction and a short axis direction with respect to the first emitted beam.

12. The optical system of claim 11, wherein the incident laser beam has an asymmetric energy distribution, and the optical system converts the incident laser beam into an emitted laser beam with a symmetric energy distribution.

13. The optical system of claim 11, wherein
the splitter, the first mirror, and the second mirror are sequentially positioned in the propagation path of the incident laser beam.

14. The optical system of claim 13, wherein
the first mirror reflects a transmitted beam received from the splitter into a first reflected beam that is inverted in the long axis direction with respect to the first emitted beam, and the second mirror reflects the first reflected beam into a second reflected beam that is inverted in the short axis direction with respect to the first reflected beam.

15. The optical system of claim 11, wherein
the splitter, the second mirror, and the first mirror are sequentially positioned in the propagation path of the incident laser beam.

16. The optical system of claim 15, wherein
the second mirror reflects a transmitted beam received from the splitter into a first reflected beam that is inverted in the short axis direction with respect to the transmitted beam, and the first mirror reflects the first reflected beam into a second reflected beam that is inverted in the long axis direction with respect to the first reflected beam.

17. The optical system of claim 15, wherein the long-short axis reversing module further includes a third mirror positioned in the propagation path of the incident laser beam.

18. The optical system of claim 17, wherein the second mirror, the first mirror, and the third mirror are sequentially positioned in the propagation path of the incident laser beam.

19. The optical system of claim 11, wherein a long axis direction of the incident laser beam incident to the first mirror is perpendicular to a boundary between the first submirror and the second submirror.

* * * * *